United States Patent [19]

White

[11] Patent Number: 5,732,963

[45] Date of Patent: Mar. 31, 1998

[54] HUMAN POWERED VEHICLE

[76] Inventor: Glenn Ellis White, 50244 Techworld, Washington, D.C. 20091

[21] Appl. No.: 560,497

[22] Filed: Nov. 17, 1995

[51] Int. Cl.$^6$ ............................................ B62M 1/18
[52] U.S. Cl. ..................... 280/221; 280/252; 280/288.1
[58] Field of Search ............................. 280/220, 221, 280/226.1, 252, 288.1

[56] References Cited

U.S. PATENT DOCUMENTS

| | | | |
|---|---|---|---|
| 642,544 | 1/1900 | Burbank | 280/220 |
| 749,153 | 1/1904 | Batchelor | 280/220 |
| 3,979,135 | 9/1976 | Meritzis | 280/226.1 |
| 4,186,934 | 2/1980 | Collings | 280/221 |
| 4,632,414 | 12/1986 | Ellefson | 280/246 |
| 4,796,907 | 1/1989 | Geller | 280/220 |
| 4,838,568 | 6/1989 | Arroyo | 280/234 |
| 4,886,287 | 12/1989 | Krause II, et al. | 280/246 |
| 4,976,451 | 12/1990 | Kamenov | 280/226.1 |
| 5,280,936 | 1/1994 | Schmidlin | 280/234 |
| 5,354,083 | 10/1994 | Liu | 280/226.1 |

FOREIGN PATENT DOCUMENTS 2403926  4/1979  France ......................... 280/226.1

*Primary Examiner*—Kevin Hurley

[57] ABSTRACT

A high performance two-wheeled human-powered vehicle propelled by a reciprocating thrust motion of the operator. An elongated bicycle frame has a gliding chest rest and slidably mounted trolley on an upper frame member, longitudinally positioned between a drivably mounted rear wheel and steerably mounted front wheel. Foot rests, to provide support for forward thrust of the body, are mounted on either side of the rear wheel. The foot rests and chest rest and trolley allow the operator to lie forward over the frame, between the wheels, and reciprocate longitudinally with the operator's upper body supported by the guiding chest rest. Attached to the trolley is a drive assembly that includes a reciprocating chain travelled around a gear. Ends of the reciprocating chain are fixed to the frame and corresponded with a biased cable, spring and pulleys; so that forward motion of the trolley causes the chain to drive a conventionally mounted sprocket, cog and continuous chain assembly.

5 Claims, 6 Drawing Sheets

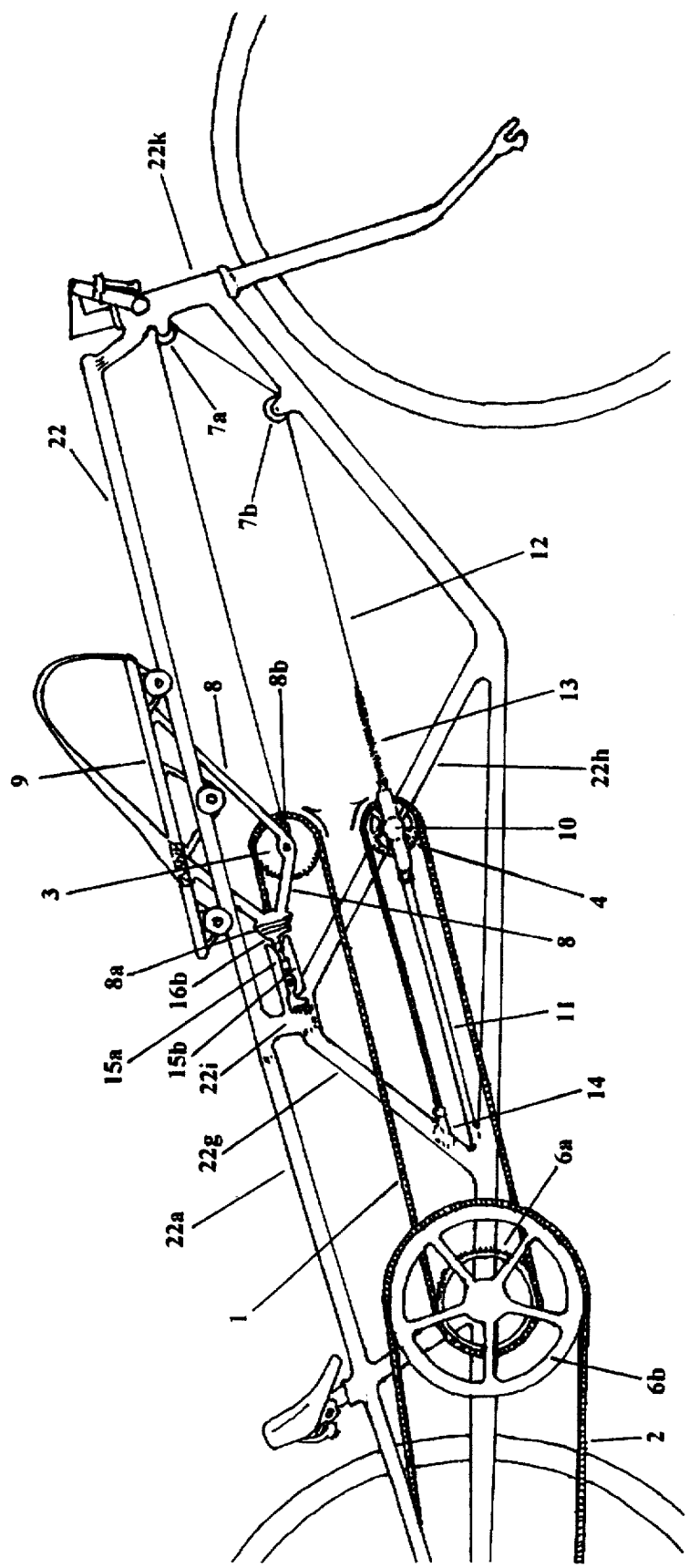

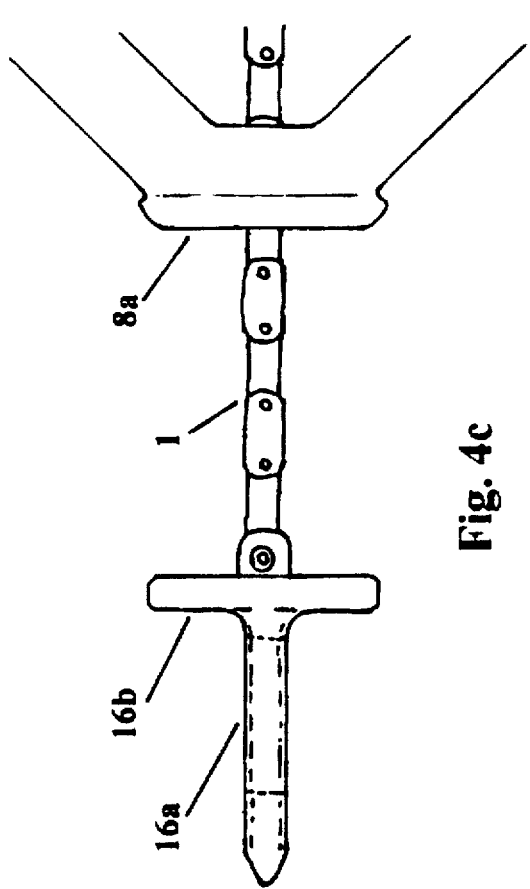
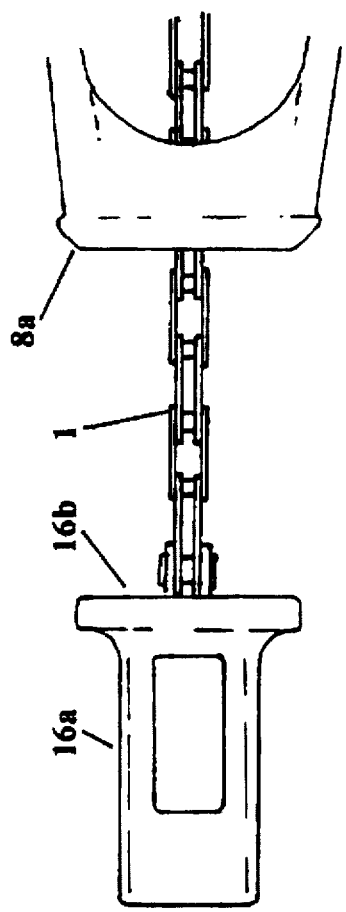
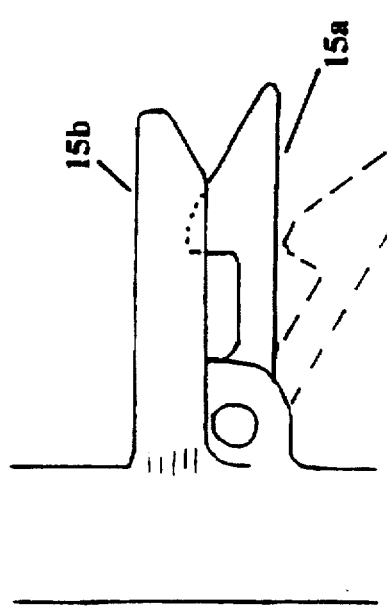
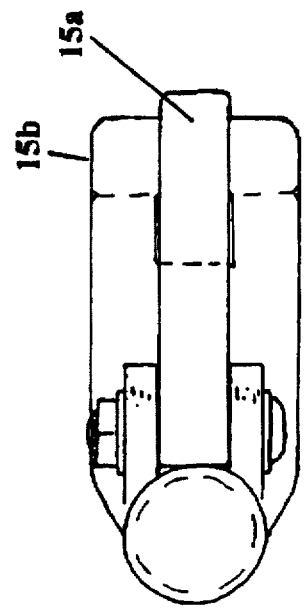
Figs. 4A-D

HUMAN POWERED VEHICLE

TECHNICAL FIELD

This invention pertains to human-powered land vehicles and in particular to two-wheeled recreational vehicles propelled by a linearly reciprocating motion of the human body.

BACKGROUND OF THE INVENTION

There are found in the prior art various examples of bicycles and tricycles where locomotion is effected by a reciprocating motion of the body. U.S. Pat. Nos. 4,886,287 and 5,280,936 disclose vehicles of this general type. Inventions by L. S. Burbank, U.S. Pat. No. 642,544, and by S. L. Batchelor, U.S. Pat. No. 749,153, patented in 1900 and 1904 respectively, are noteworthy as examples of reciprocating machines mounted onto bicycle frames with two equal, standard sized bicycle wheels. A two-wheeled human powered vehicle disclosed in U.S. Pat. No. 4,838,568 provides a near prone riding position.

Nearly all vehicles powered in this manner and identified in the prior art, place the rider in a seated, feet-forward position, on either a tricycle or recumbent bicycle. With the rider in such a position, these vehicles do not optimize the human-body's potential for horsepower derived from reciprocating motion. The operator, while seated feet first and upright, also presents less than an ideal aerodynamic profile for high-speed cycling.

L. S. Burbank's "Bicycle" and Sanford L. Batchelor's "Bicycle with Rowing Attachment," cited above, mount operator, rowing machine and steering controls above a conventional bicycle frame. This adherence to conventional bicycle frame design, common to many turn-of-the-century "rowing bicycles", accommodates lighter frames than might be found with comparable recumbent bicycles or tricycles, and would offer a certain commercial advantage, to the extent that standard bicycle wheels and other fittings were used. Unfortunately, a high center of gravity and delicate steering, typical of "rowing bicycles," has all but precluded design evolution in this direction.

Several vehicles in the prior art disclose drives wherein a reciprocating chain transfers torque from a fulcrumed lever, fitted with pedals, handlebars or both, to a conventional cog, sprocket and continuous chain assembly. As disclosed, embodiments of this drive configuration have relatively slow-moving reciprocating chains. Although appropriate gear ratios allow acceptable top speeds, slow-moving drive mechanisms limited a vehicle's acceleration and edge of momentum. With pronounced velocity oscillation at low speeds, and typically heavier frames, poor acceleration and edge of momentum are significant liabilities for reciprocally powered tricycles and recumbent bicycles, especially when driving such vehicles over grades.

SUMMARY OF THE INVENTION

The object of the instant invention is to provide a sprite, ergonomical human-powered vehicle. It is further the object of the present invention to incorporate these features in a vehicle that would be commercially viable to manufacture and affordable to a broad public. To affect these objects, the vehicle provides a reciprocating machine to aggregate the force of both legs. Comprised of a slidable chest support apparatus and foot braces, the reciprocating machine corresponds with a high speed drive assembly which transfers power to the road wheel via a reciprocating chain, continuous chain, sprocket and cog. The drive assembly and reciprocating mechanism are ergonomically and aerodynamically positioned on the frame, with the operator, to provide minimal vehicle weight and wind resistance. An elongated safety bicycle frame, with equal sized wheels and conventionally mounted drive sprocket, cog and continuous chain yield commercial advantage.

A particular feature of the frame is a riding position that longitudinally aligns the body between the points of support and resistance on the reciprocating machine. Compared with the seated position, this feature should afford more efficient, comfortable propulsion, where muscle stress may be more readily alternated among muscles groups of both the front and back of the body.

A particular feature of the drive assembly is a gear, suspended from a rigid bracket beneath the chest support trolley. This accelerator gear functions as a pulley, around which a reciprocating cable is made to travel before engaging the drive sprocket. The gear doubles the velocity of the reciprocating chain over the drive sprocket, relative to a speed of the trolley. Acceleration and edge of momentum are thus enhanced. Further, a low-drive latch assembly allows the reciprocating chain either to be anchored at the latch and travel over the accelerator gear or travel with the accelerator gear and drive assembly along the guide path of the trolley. This option effectively extends the overall top speed range of the vehicle.

DESCRIPTION OF THE DRAWINGS

When referenced to individually, symmetrical components are identified by identical number with discreet letter suffixes. Functionally related sub-components also are identified in this manner.

FIG. 3 is a lateral detail of the drive assembly. Arrows indicate the direction of motion for various components during the drive stroke.

FIG. 4a–b is a schematic of the low-drive latch assembly where FIG. 4a is the lateral detail of the assembly, with the latch arm in latched position. A broken line outlines the latch arm in the unlatched position. FIG. 4b is a bottom detail of the low-drive latch assembly.

FIG. 4c–d is a schematic of the latch hook and ring assembly and the reciprocating chain stop. FIG. 4c is a lateral detail of the latch ring, hook and stop. FIG. 4d is a bottom detail of same. In each view, the rear portion of the drive bracket is illustrated for reference.

DETAILED DESCRIPTION OF THE DRAWINGS

Figure 1:
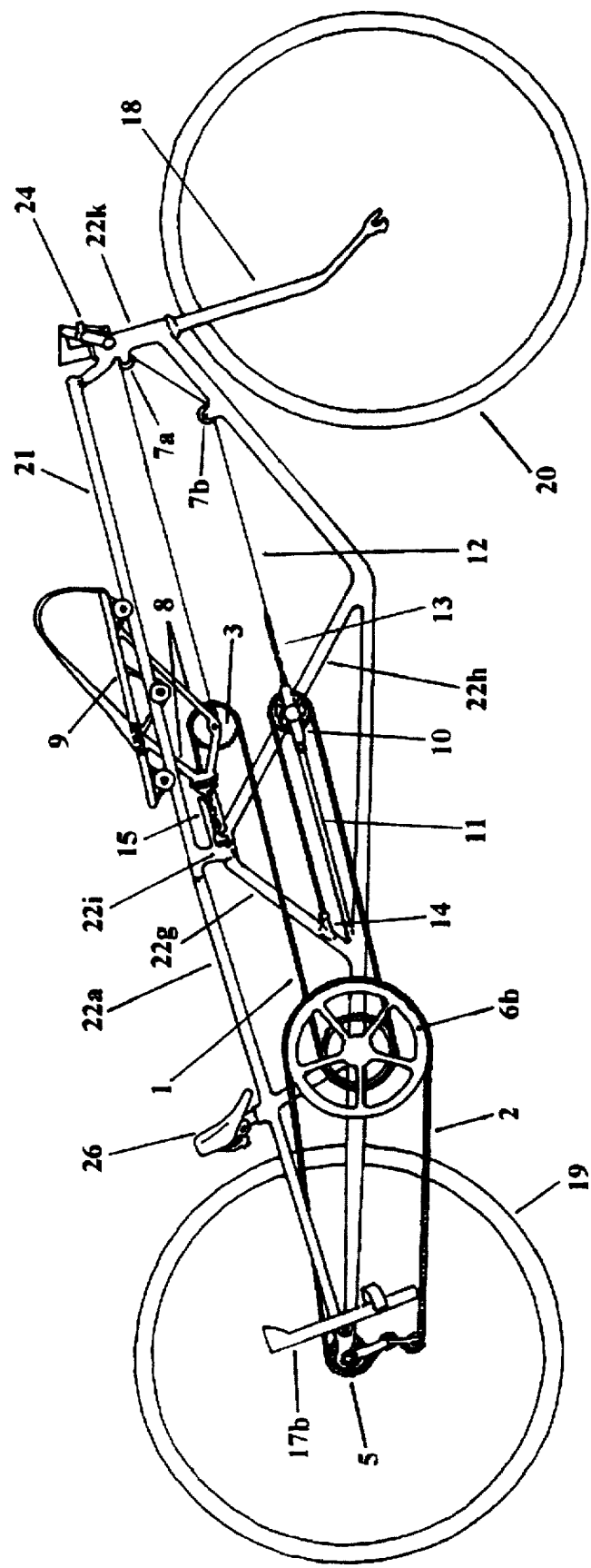
FIG. 1 is a lateral view of the vehicle, with chest rest and trolley assembly in rest position. Left sides of paired components are not visible in this view.
Figure 2:
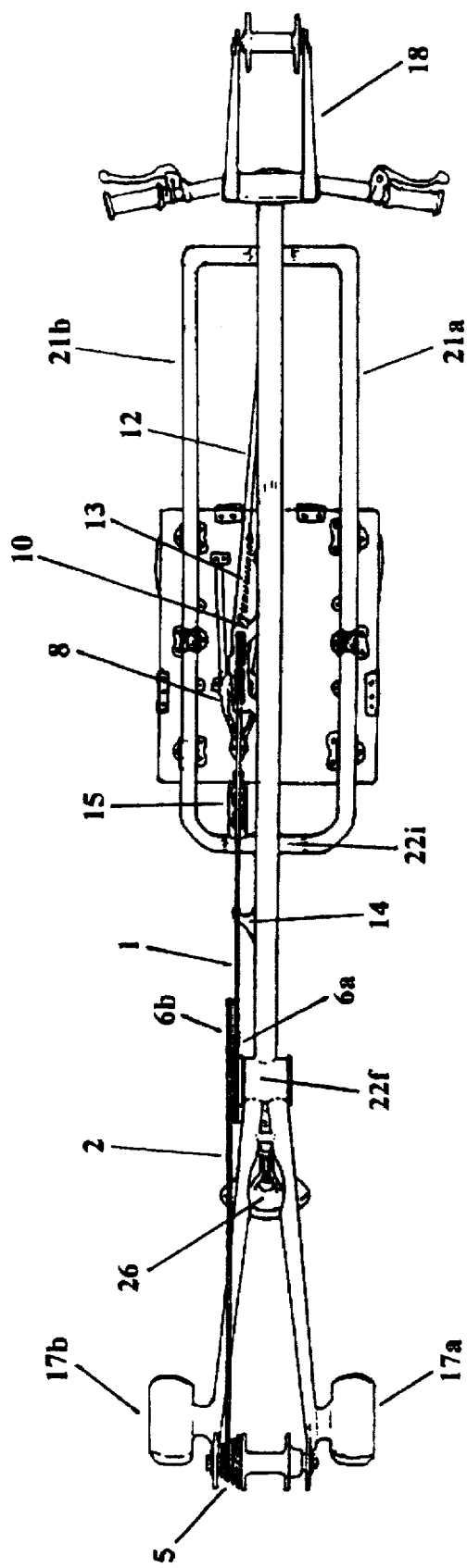
FIG. 2 is a bottom view of the vehicle, showing the lateral alignment of various components. Wheel rims, but not wheels, are represented in this view. Right and left aspects of symmetrical components are specifically designated in this view.

Referring now to FIG. 1 through 3, a high performance human-powered vehicle is shown. Seat 26 is mounted on frame 22 between drivably mounted rear wheel 19 and steerably mounted front wheel 20. Frame 22 is elongated and fitted with guides 21, extended longitudinally from upper frame member 22a and mid-frame support yoke 22i to steering tube 22k. Guides 21 support sliding chest rest and trolley assembly 9 beneath which drive bracket 8 with chain stop 8a is attached. Positioned beneath chest rest and trolley 9, and between guides 21a–b, accelerator gear 3 is turnably attached to drive bracket 8. Foot rests 17a and 17b are fixed to frame at either side of rear wheel 19. Handlebars 24 are rigidly fixed to steering fork 18 and turnably mounted through steering tube 22k at front of frame 22 to steer front wheel and vehicle.

Referring now to FIG. 3 and 4a–d, one end of reciprocating chain 1 is fitted with ring and disc assembly 16a–b and travelled through drive bracket 8. Chain stop 8a on drive bracket 8 and ring 16b on reciprocating chain 1 prohibit the end of chain 1 from passing completely over accelerator gear 3. Low-drive latch assembly 15a–b is mounted on frame 22 at mid-frame support yoke 22i to engage or release reciprocating chain ring and disc assembly 16a–b. Referring now to FIG. 4a–d, ring 16a may be locked between low-drive latch plate 15a and latch arm 15b or drawn fast against chain stop 8a.

Referring again to FIG. 3, reciprocating chain 1 extends forwardly and engages accelerator gear 3, then extends rearwardly around drive sprocket 6a, which is laterally journaled through frame 22 at bottom bracket shell 22f located beneath seat 26. From drive sprocket 6a, reciprocating chain 1 extends forwardly and around biasing gear assembly 10 before it is attached to frame 22 with chain mount 14 at the base of rear diagonal frame member 22g. Bias is effected on reciprocating chain 1 via a pair of pulleys 7 and cable 12, one end of which is attached to coupling 8b on drive bracket 8, as the other is attached to spring 13 on biasing gear assembly 10. Biasing gear guide 11 is mounted to frame 22 and extends diagonally, from the base of rear diagonal support member 22g, forward to the middle portion of front diagonal. support member 22h. Guide 11 is radially aligned with drive and driven sprockets 6a–b towards lower biasing cable pulley 7b, so as to allow biasing gear assembly 10 to glide opposingly, towards or away from the drive sprocket 6a, in response to back and forth motion of the trolley 9.

Referring now to FIG. 1 and 3, the movement of reciprocating chain 1, biased against drive sprocket 6a, cause driven sprocket 6b, cog 5 and continuous chain 2 to be turned. Drive sprocket 6a, driven sprocket 6b, cog 5 and continuous chain 2, all are mounted to frame 22 in a fashion common to safety bicycles, where cog 5 is laterally journaled coaxially with rear wheel 19, while drive 6a and driven sprockets 6b are laterally journaled at bottom bracket shell 22f. The forward thrust of the upper body on chest rest and trolley 9 drives reciprocating chain 1 over drive sprocket 6a while bias of cable 12, guided about cable pulleys 7, cause reciprocating chain 1 to drive sprockets 6a and 6b. Continuous drive chain 2, mounted on driven sprocket 6b and cog 5, cause rear wheel 19 and vehicle to be driven.

Figure 5:
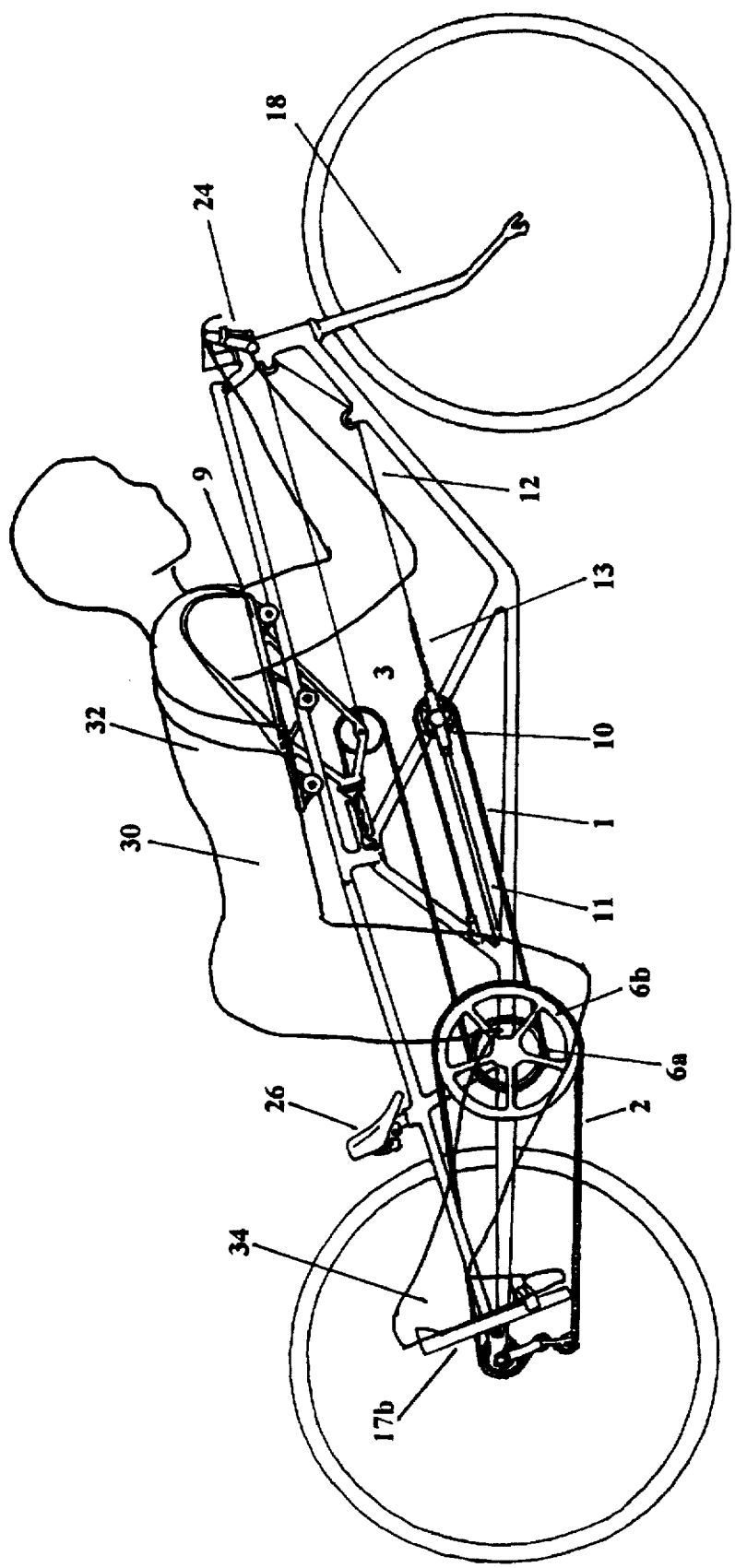
FIG. 5 is a lateral view of the vehicle with operator in silhouette and with chest rest and trolley assembly in rest position.
Figure 6:
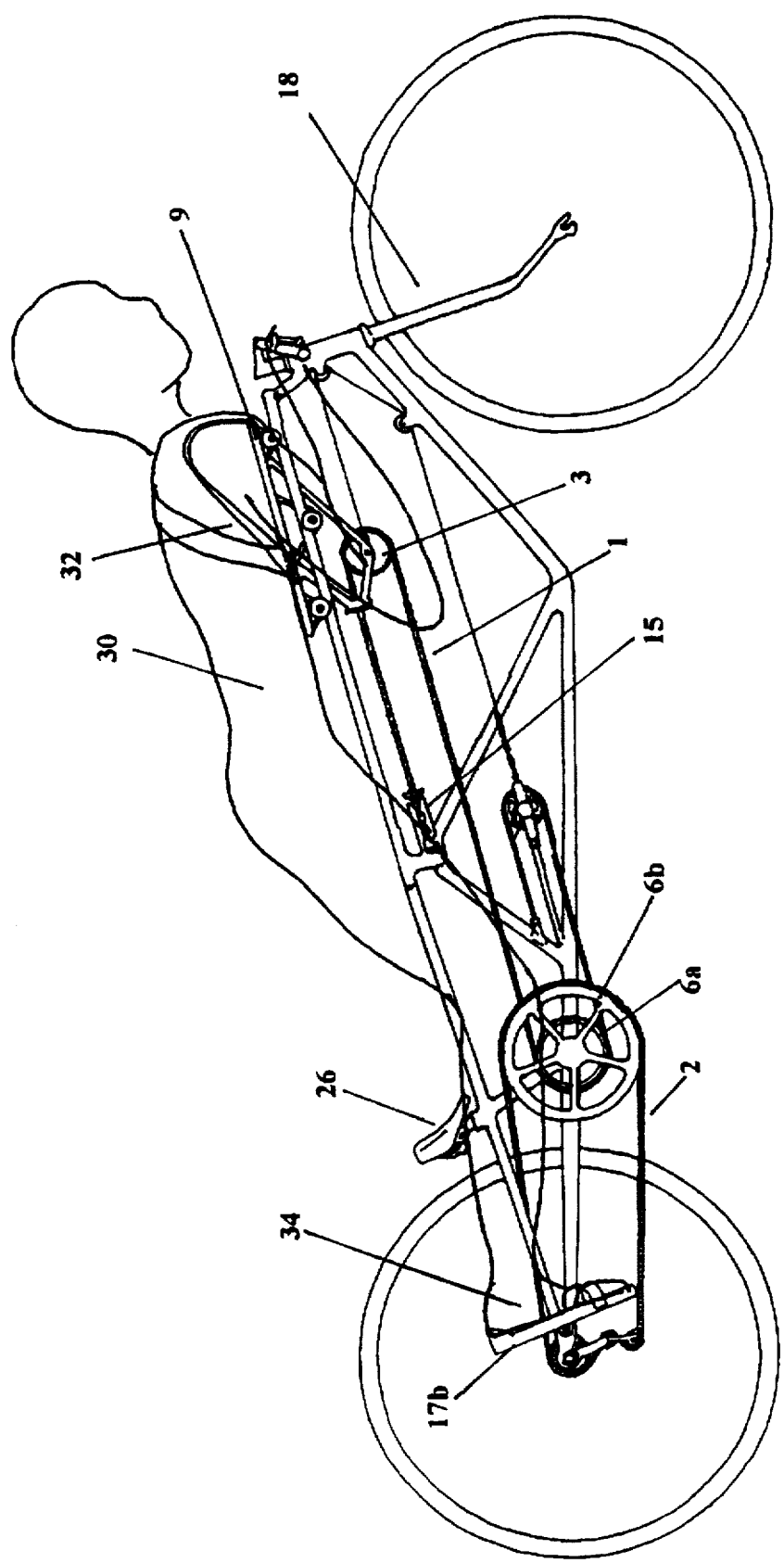
FIG. 6 is a lateral view of the vehicle with operator in silhouette and with chest rest and trolley assembly in extended position.

Referring now to FIGS. 1, 5 and 6, to propel the vehicle, the operator 30 must set any gear shift options to low and open low-drive latch 15. From a seated, near prone, position, the rider grasps the handlebars 24 and rests the upper body 32 on the chest rest and trolley 9. After scooting forward with feet 34 to gain momentum, the rider 30 places the feet 34 in the foot rests 17a–b and begins to thrust forward against the chest rest and trolley 9. As operator and vehicle attain cruising speed, the low-drive latch assembly 15 can be set to closed position. When the chest rest and trolley assembly 9 is next reciprocated to rest position, the reciprocating chain 1 ring will be seized at the site of latch assembly 15, causing the reciprocating chain 1 to run over the accelerator gear 3 before travelling over the drive sprocket 6a. Thusly, the drive mechanism is effectively shifted to over-drive, with the chain 1 moving twice the distance that it is moved when the ring and disk 16a and 16b are released from the latch assembly 15.

DESCRIPTION OF THE PREFERRED EMBODIMENT

The preferred embodiment of the present invention is constructed of quality materials and, to the extent possible, meets specifications standard to safety bicycle manufacture. The preferred embodiment of the frame is constructed of double-butted alloy steel or aluminum tubing and adapted to mount standard 24 to 27 inch diameter bicycle rims, and outfitted for conventional brakes (brake calibers not illustrated). The rear wheel may be fitted with a multi-speed dedrailleur to shift cog gears. Splash guards (not illustrated) should be added to protect operator and drive components from road debris and rain water. The seat is spring loaded so to angle the padded portion forward, towards the trolley, in order to act as a back-stop during reciprocation on the trolley assembly. In lieu of shoulder straps, the preferred embodiment of the chest rest and trolley assembly would employ a molded fiberglass open back harness, contoured to surround the operator's shoulders and ribs; this to permit easy mount and dismount. The use of a custom molded harness also would act to optimize respiratory performance on the vehicle and, for many women, better accommodate the upper-body contour. To enhance vehicle maneuverability, a flat, laterally shiftable, coaster would be mounted between the harness and the trolley to permit the operator to shift body weight laterally when turning the vehicle. The low-drive latch assembly will be fitted with a spring, sheathed cable and handlebar control (not illustrated) to open and close the spring-loaded latch arm.

What is claimed is:

1. A two-wheeled human-powered land vehicle comprising:
    a. an elongated bicycle frame with a drivably mounted rear wheel and a steerably mounted front wheel,
    b. an operator support means slidably mounted on said frame, between said rear wheel and said front wheel for longitudinal reciprocating movement,
    c. two foot rests mounted to said frame on either side of said rear wheel,
    d. a drive assembly comprising:
        an accelerator gear mounted to said occupant support means, a drive and a driven sprocket rotatably attached to the frame, said drive and driven sprockets being rigidly attached to one another, a driven cog coaxially journalled to said rear wheel to transmit torque thereto, a continuous chain engaged around said driven sprocket and driven cog, a reciprocating chain removably attached at one end to said frame, said reciprocating chain being engaged around said accelerator gear and said drive sprocket, said reciprocating chain being attached to said frame at its other end, and biasing means engaged with said reciprocating chain for keeping tension in said reciprocating chain.

2. The two-wheeled human-powered land vehicle of claim 1 wherein:
    said biasing means comprises a biasing gear assembly slidably mounted on a guide attached to the frame, said reciprocating chain being engaged around said biasing gear assembly, a spring attached at one end to said biasing gear assembly, and a cable attached at one end to said spring and at its other end to said occupant support means.

3. The two-wheeled human-powered land vehicle of claim 1 wherein:

the reciprocating chain is removably attached to the frame by a low-drive latch assembly.

4. The two-wheeled human-powered land vehicle of claim 1 wherein:

the reciprocating chain includes a stop member attached at one end thereof, said occupant support means includes a drive bracket, said reciprocating chain extending through an opening in said drive bracket, said stop member being of sufficient size so as to not fit through said opening.

5. The two-wheeled human-powered land vehicle of claim 1 wherein:

the occupant support means comprises a trolley adapted to support a riders chest area.

* * * * *